(12) United States Patent
De Gaillard et al.

(10) Patent No.: US 11,015,462 B2
(45) Date of Patent: May 25, 2021

(54) BLADE BODY AND A BLADE MADE OF COMPOSITE MATERIAL HAVING FIBER REINFORCEMENT MADE UP BOTH OF THREE-DIMENSIONAL WEAVING AND ALSO OF SHORT FIBERS, AND METHOD OF FABRICATION

(71) Applicant: SAFRAN AIRCRAFT ENGINES, Paris (FR)

(72) Inventors: Thomas Alain De Gaillard, Moissy-Cramayel (FR); Clément Pierre Postec, Moissy-Cramayel (FR); Charles-Henri Claude Jacky Sullet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 85 days.

(21) Appl. No.: 16/418,147

(22) Filed: May 21, 2019

(65) Prior Publication Data

US 2019/0360345 A1 Nov. 28, 2019

(30) Foreign Application Priority Data

May 22, 2018 (FR) ........................................ 1854234

(51) Int. Cl.
*F01D 5/28* (2006.01)
*F04D 29/02* (2006.01)
*F04D 29/38* (2006.01)

(52) U.S. Cl.
CPC ........... *F01D 5/282* (2013.01); *F04D 29/023* (2013.01); *F04D 29/388* (2013.01); *F05D 2300/603* (2013.01)

(58) Field of Classification Search
CPC .. F01D 5/282; F04D 29/388; F05D 2300/603; F05D 2300/6034; F05B 2280/6003; B29C 70/081
See application file for complete search history.

(56) References Cited

U.S. PATENT DOCUMENTS 3,932,568 A * 1/1976 Watts .................... C04B 35/532
264/29.7
4,118,147 A * 10/1978 Ellis .......................... F01D 5/16
416/230

(Continued)

FOREIGN PATENT DOCUMENTS

EP 1481754 A1 * 12/2004 .............. B23P 15/02
EP 1640562 A1 * 3/2006 ............... F01D 5/16

(Continued)

OTHER PUBLICATIONS

Search Report as issued in French Patent Application No. 1854234, dated Jan. 18, 2019.

*Primary Examiner* — Ninh H. Nguyen
*Assistant Examiner* — Brian Christopher Delrue
(74) *Attorney, Agent, or Firm* — Pillsbury Winthrop Shaw Pittman LLP (57) ABSTRACT

A blade body made of composite material includes fiber reinforcement densified by a matrix, the blade body extending in a longitudinal direction between a root or bottom portion and a tip or top portion, and in a transverse direction between a leading edge and a trailing edge. The fiber reinforcement of the blade body includes a first portion constituted by a plurality of yarn layers interlinked by three-dimensional or multilayer weaving, and a second portion forming all or part of at least one leading edge or at least one trailing edge of a blade. The second portion includes a plurality of short fibers oriented in random manner, the yarns of the plurality of yarn layers of the first (Continued)

portion and the short fibers of the second portion being embedded in the matrix.

11 Claims, 6 Drawing Sheets

(56) References Cited

U.S. PATENT DOCUMENTS

| | | | | |
|---|---|---|---|---|
| 4,443,507 | A * | 4/1984 | Yamada | B29C 51/14 |
| | | | | 428/114 |
| 4,868,038 | A * | 9/1989 | McCullough, Jr. | C08K 7/06 |
| | | | | 428/222 |
| 4,988,780 | A * | 1/1991 | Das | C08G 8/28 |
| | | | | 525/480 |
| 5,913,661 | A * | 6/1999 | Panovsky | F01D 5/16 |
| | | | | 416/229 A |
| 5,931,641 | A * | 8/1999 | Finn | F01D 5/147 |
| | | | | 416/229 A |
| 6,039,542 | A * | 3/2000 | Schilling | F01D 5/16 |
| | | | | 416/233 |
| 6,042,338 | A * | 3/2000 | Brafford | F01D 5/20 |
| | | | | 416/203 |
| 6,282,786 | B1 * | 9/2001 | Evans | F01D 5/16 |
| | | | | 29/889.72 |
| 6,413,051 | B1 * | 7/2002 | Chou | B23P 6/005 |
| | | | | 416/229 A |
| 7,101,154 | B2 * | 9/2006 | Dambrine | F01D 5/282 |
| | | | | 416/230 |
| 7,241,112 | B2 | 7/2007 | Dambrine et al. | |
| 7,429,166 | B2 * | 9/2008 | Mitchell | F01D 5/00 |
| | | | | 416/230 |
| 7,540,710 | B2 * | 6/2009 | Grote | C21B 7/06 |
| | | | | 415/200 |
| 7,547,194 | B2 * | 6/2009 | Schilling | F01D 5/282 |
| | | | | 416/230 |
| 7,607,287 | B2 * | 10/2009 | Reba | F01D 9/02 |
| | | | | 415/115 |
| 7,946,825 | B2 * | 5/2011 | Tudor | F04D 29/384 |
| | | | | 416/223 A |
| 8,043,065 | B2 * | 10/2011 | Kyriakides | F03D 1/0675 |
| | | | | 416/224 |
| 8,083,489 | B2 * | 12/2011 | Viens | F04D 29/388 |
| | | | | 416/229 R |
| 8,585,368 | B2 * | 11/2013 | Viens | F04D 29/324 |
| | | | | 416/191 |
| 8,763,360 | B2 * | 7/2014 | Murdock | F01D 5/26 |
| | | | | 60/226.1 |
| 8,807,955 | B2 * | 8/2014 | Wrabel | F01D 5/20 |
| | | | | 416/241 R |
| 9,150,305 | B2 * | 10/2015 | Mancher | B64C 27/33 |
| 9,181,814 | B2 * | 11/2015 | Rowley | F01D 11/001 |
| 9,752,441 | B2 * | 9/2017 | Hildebrand | F01D 5/20 |
| 9,945,234 | B2 * | 4/2018 | Jevons | F01D 5/282 |
| 10,125,616 | B2 * | 11/2018 | Rosenau | F01D 5/28 |
| 10,570,917 | B2 * | 2/2020 | Weisse | F02K 3/06 |
| 2005/0084377 | A1 * | 4/2005 | Dambrine | B29C 70/48 |
| | | | | 416/223 R |
| 2013/0272893 | A1 * | 10/2013 | Fabre | F04D 29/324 |
| | | | | 416/226 |
| 2015/0176421 | A1 * | 6/2015 | Verheist | F04D 29/522 |
| | | | | 415/208.2 |
| 2016/0201607 | A1 * | 7/2016 | Gallagher | F04D 29/023 |
| | | | | 415/144 |
| 2016/0326690 | A1 * | 11/2016 | Rozant | B32B 25/20 |
| 2017/0362753 | A1 * | 12/2017 | Le Costaouec | C04B 41/4554 |
| 2018/0010614 | A1 * | 1/2018 | Sellinger | F01D 5/282 |
| 2018/0334912 | A1 * | 11/2018 | Le Meur | B32B 5/10 |
| 2019/0040760 | A1 * | 2/2019 | Clegg | F01D 25/30 |
| 2019/0071549 | A1 * | 3/2019 | Koshi | B32B 7/12 |
| 2019/0308376 | A1 * | 10/2019 | Backhouse | B32B 38/0012 |
| 2020/0024958 | A1 * | 1/2020 | Gill | B29C 70/12 |
| 2020/0072062 | A1 * | 3/2020 | MacMahon | F01D 9/02 |
| 2020/0109634 | A1 * | 4/2020 | Gondre | F01D 5/288 |

FOREIGN PATENT DOCUMENTS

| | | | | |
|---|---|---|---|---|
| FR | | 3008185 A1 * | 1/2015 | F01D 5/14 |
| WO | WO 2010/061140 A1 | | 6/2010 | |

* cited by examiner

BLADE BODY AND A BLADE MADE OF COMPOSITE MATERIAL HAVING FIBER REINFORCEMENT MADE UP BOTH OF THREE-DIMENSIONAL WEAVING AND ALSO OF SHORT FIBERS, AND METHOD OF FABRICATION

CROSS-REFERENCE TO RELATED APPLICATIONS

This application claims priority to French Patent Application No. 1854234, filed May 22, 2018, the entire content of which is incorporated herein by reference in its entirety.

FIELD

The present invention relates to the general field of fabricating blades out of composite material comprising fiber reinforcement densified by a matrix, the matrix being obtained by injecting a liquid composition containing a precursor for the matrix into a fiber preform.

The intended field is that of gas turbine blades for aeroengines or industrial turbines, and more particularly but not exclusively fan blades for aeroengines.

BACKGROUND

Fabricating a blade out of composite material comprises the following steps:
a) making a fiber structure by three-dimensional or multilayer weaving;
b) compacting and shaping the fiber structure;
c) placing the resulting fiber preform in tooling for injection molding of the "resin transfer molding" (RTM) type;
d) injecting into the fiber preform a liquid composition that is a precursor of a matrix material, such as a resin; and
e) transforming the liquid composition into a matrix so as to obtain a shaped element made of composite material comprising fiber reinforcement densified by a matrix.

Making a blade out of composite material obtained from fiber reinforcement made by three-dimensional weaving and densified with a matrix is described in particular in Document US 2005/0084377.

Three-dimensional (3D) or multilayer weaving serves to give the resulting composite material blade very good mechanical strength. Nevertheless, the good mechanical strength imparted by three-dimensional or multilayer weaving is more difficult to obtain in portions of the blade that present small thicknesses, of the order of 1 millimeter (mm) to 2 mm, as happens at the leading and/or trailing edges of a blade. Specifically, from a mechanical point of view, and in compliance with the requirements of specifications, the leading edge and the trailing edge need to be capable of withstanding or limiting damage when they are subjected to various stresses such as bird strikes or repeated cycles in flight (erosion/lifetime).

The difficulty in obtaining portions of small thickness having good mechanical strength by three-dimensional weaving can be explained by:
the strands or yarns used by 3D or multilayer weaving are of large size or coarseness, which size is of millimeter order; and
the number of layers of strands or yarns needed in the warp and weft directions in order to provide good mechanical strength, since it is more difficult to obtain good mechanical strength by interlacing only two layers of yarns (the minimum number of layers of warp or weft yarns in order to perform 3D or multilayer weaving) than by interlacing a larger number of layers of yarns.

SUMMARY

Consequently, an aspect of the present invention is to propose a solution for a blade made of composite material that does not present the above-mentioned drawbacks and that makes it easy to form blade with fine portions that have good mechanical properties.

To this end, an embodiment of the invention provides in particular a blade body made of composite material comprising fiber reinforcement densified by a matrix, the blade body extending in a longitudinal direction between a root or bottom portion and a tip or top portion, and in a transverse direction between a leading edge and a trailing edge, the blade body being characterized in that its fiber reinforcement comprises a first portion constituted by a plurality of yarn layers interlinked by three-dimensional or multilayer weaving, and a second portion forming all or part of at least one leading edge or at least one trailing edge, the second portion comprising a plurality of short fibers oriented in random manner, the yarns of the plurality of yarn layers of the first portion and the short fibers of the second portion being embedded in the matrix.

By combining three-dimensional or multilayer weaving with short fibers in a single piece of fiber reinforcement, it is possible to obtain a blade body having fine thicknesses at the leading and/or trailing edge while ensuring good mechanical strength for the blade body. The short fibers provide stiffness serving to ensure good mechanical strength in the fine portions of the blade body where there is no three-dimensional or multilayer weaving. The use of short fibers gives very great freedom of design and enables fine portions to be made either over a small extent or else over a large zone.

According to a first particular characteristic of the blade body of the invention, the second portion forms a leading edge portion of the blade, the second portion extending in the longitudinal direction over a height that is less than the total height of the leading edge of the blade. It is thus possible to use the short fibers to define a fine leading edge only in that portion of the blade body where that is needed aerodynamically.

According to a second particular characteristic of the blade body of the invention, the short fibers are carbon fibers presenting length lying in the range 1 mm to 50 mm or length lying in the range 0.1 mm to 1 mm.

An aspect of the invention also provides a blade made of composite material comprising a blade body of the invention, wherein the second portion of the blade body forms all or part of a leading edge of the blade, and wherein the leading edge of the blade further comprises metal foil covering the second portion. This provides a blade having a leading edge that is both fine and also capable of withstanding impacts with foreign bodies.

The blade may in particular be a blade selected from: a fan blade, an outlet guide vane, an inlet guide vane, and a variable stator vane.

An aspect of the invention also provides a method of fabricating a blade body made of composite material, the method comprising:
making a fiber preform;
placing the fiber preform in an injection mold;
injecting a resin into the fiber preform; and transforming the resin into a matrix so as to obtain a blade body made of composite material comprising fiber reinforcement densified by a matrix, the blade body extending in a longitudinal direction between a root or bottom portion and a tip or top portion, and extending in a transverse direction between a leading edge and a trailing edge of the blade;

the method being characterized in that the fiber preform of the blade body comprises a first portion constituted by a plurality of yarn layers interlinked by three-dimensional or multilayer weaving and a second portion constituted by short fibers oriented in random manner, the short fibers of the second portion being placed adjacent to the first portion in a portion of the injection mold corresponding to all or part of at least the leading edge or at least the trailing edge of the blade.

By combining three-dimensional or multilayer weaving with short fibers in a single piece of fiber reinforcement, it is possible to obtain a blade body having fine thicknesses at the leading and/or trailing edge while ensuring good mechanical strength for the blade body. The short fibers provide stiffness serving to ensure good mechanical strength in the fine portions of the blade body where there is no three-dimensional or multilayer weaving. The use of short fibers gives very great freedom of design and enables fine portions to be made either over a small extent or else over a large zone.

In addition, with the method of an embodiment of the invention, scrap yarns or strands resulting from the three-dimensional or multilayer weaving can beneficially be used to provide the short fibers, thereby keeping down the cost of fabricating the blade body. The method of fabricating the blade body of the invention is also simple to perform.

According to a first particular characteristic of the method of the invention, the short fibers of the second portion are placed adjacent to the first portion in a portion of the injection mold corresponding to a portion of the leading edge of the blade in the longitudinal direction.

According to a second particular characteristic of the method of the invention, the short fibers are carbon fibers presenting length lying in the range 1 mm to 50 mm, or length lying in the range 0.1 mm to 1 mm.

An aspect of the invention also provides a method of fabricating a blade out of composite material, the method comprising making a blade body of the invention, wherein the second portion of the blade body forms all or part of the leading edge of the blade, and the method further comprises fastening metal foil on the second portion.

BRIEF DESCRIPTION OF THE DRAWINGS

Other characteristics and benefits of the invention appear from the following description of particular embodiments of the invention, given as non-limiting examples, and with reference to the accompanying drawings, in which.

DETAILED DESCRIPTION

Various aspects of the invention apply in general manner to making blade bodies or blades out of composite material, itself made from a fiber preform into which a liquid composition that is a precursor of a matrix material is injected and then transformed so as to obtain a blade comprising fiber reinforcement densified by a matrix. Non-limiting examples of such blades comprise in particular fan blades, outlet guide vanes (OGVs), inlet guide vanes (IGVs), variable stator vanes (VSVs), etc.

A method of fabrication in accordance with the invention is described with reference to fabricating a turbine engine fan blade. The method of fabricating a composite material blade in accordance with the invention begins by making a fiber blank that is obtained by three-dimensional weaving of by multilayer weaving.

The term "three-dimensional weaving" or "3D weaving" is used herein to mean a weaving technique in which at least some of the warp yarns interlink weft yarns over a plurality of weft layers, such as for example "interlock weaving". The term "interlock weaving" is used herein to mean a 3D weaving in which each warp layer interlinks a plurality of weft layers with all of the yarns in the same warp column having the same movement in the weave plane.

The term "multilayer weaving" is used herein to mean 3D weaving with a plurality of weft layers, in which each layer has a base weaving that is equivalent to a conventional 2D weave, such as a weave of plain, satin, or twill type, but with certain points of the weave that link the weft layers together.

Making the fiber structure by 3D or multilayer weaving makes it possible, in a single textile operation, to obtain linking between the layers, and thus to have good mechanical strength for the fiber structure and for the resulting composite material part.

There follows a description of an example of making a fiber structure in accordance with an embodiment of the invention. In this example, the weaving is performed on a Jacquard type loom.

Figure 1:
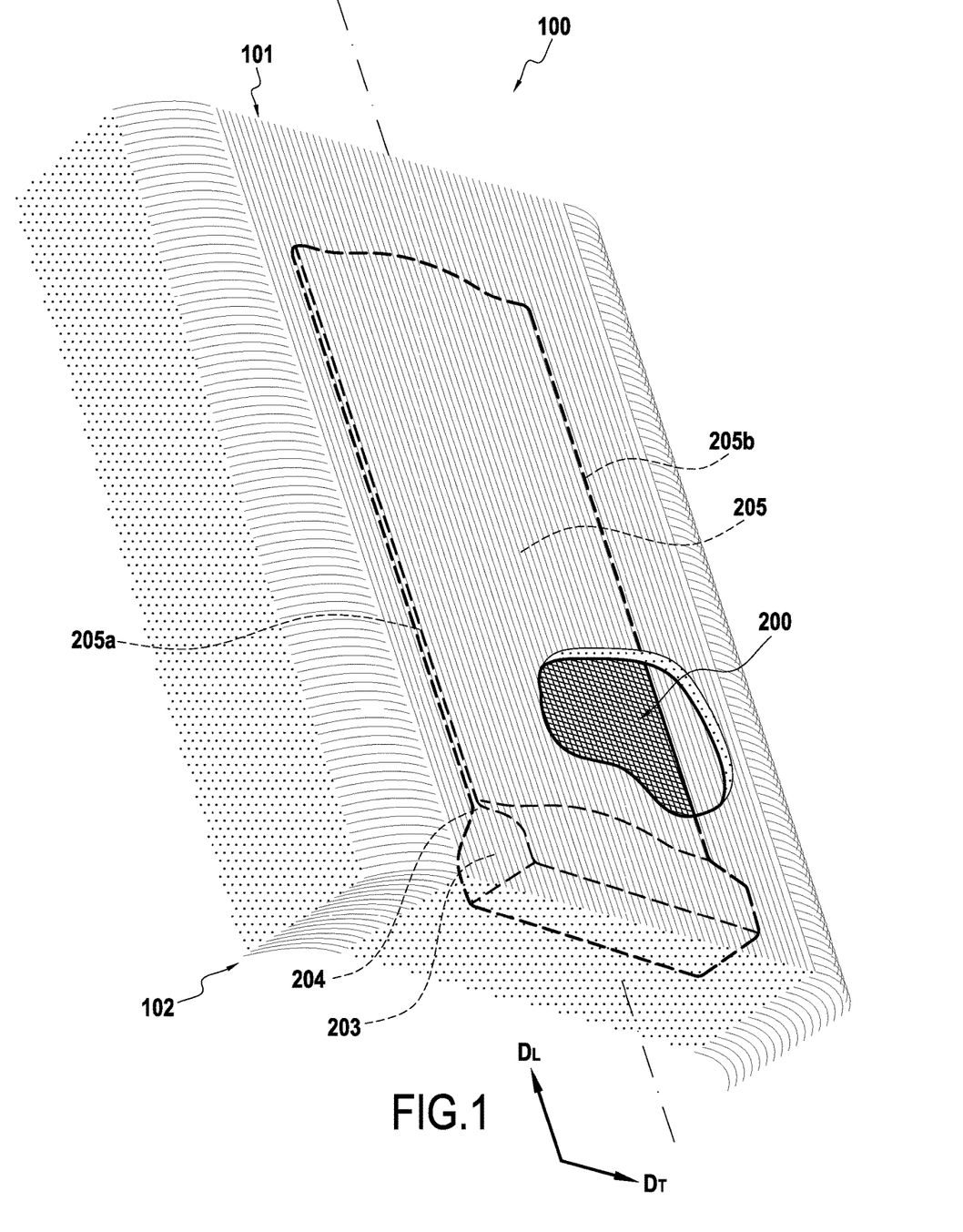
FIG. 1 is a highly diagrammatic view of a three-dimensionally woven fiber blank for making a fiber structure in an embodiment of the invention.

FIG. 1 is a highly diagrammatic view showing the weaving of a fiber blank 100 from which it is possible to extract a fiber texture 200 (FIG. 2) suitable for obtaining a fiber reinforcement preform for an aeroengine blade body.

The fiber blank 100 is obtained by three-dimensional weaving, or "3D weaving", or by multilayer weaving that is performed in known manner by means of a Jacquard type loom having arranged thereon a bundle of warp yarns or strands 101 in a plurality of layers, the warp yarns being linked together by weft layers 102 that are likewise arranged in a plurality of layers, some of the weft layers comprising braids. A detailed example of making a fiber preform that is to form the fiber reinforcement of a blade for an aeroengine from a 3D woven fiber blank is described in detail in particular in the following documents: U.S. Pat. Nos. 7,101,154, 7,241,112, and WO 2010/061140.

The fiber blank 100 is woven in the form of a strip extending generally in a longitudinal direction $D_L$ that corresponds to the longitudinal direction of the blade that is to be made. In the fiber blank 100, the fiber structure 200 presents varying thickness that is determined as a function of the longitudinal thickness and of the profile of the airfoil of the blade that is to be made. In its portion that is to form a root preform, the fiber structure 200 presents a portion 203 of greater thickness that is determined as a function of the thickness of the root of the blade that is to be made. The fiber structure 200 is extended by a portion 204 of decreasing thickness that is to form the shank of the blade, followed by a portion 205 that is to form a blade airfoil. In a transverse direction $D_T$ perpendicular to the longitudinal direction $D_L$, the portion 205 presents a profile of thickness that varies between its edge 205a that is to form a leading edge portion of the blade and its edge 205b that is to form a trailing edge of the blade. The portion 205 has first and second faces 205c and 205d that extend between the edges 205a and 205b (FIG. 2) and that are to form the pressure side face and the suction side face of the blade airfoil, or vice versa.

The fiber structure 200 is woven as a single piece and after cutting away non-woven yarns of the blank 100 it is to present the almost-final shape and dimensions of the blade (referred to as the "net shape"), which in practice includes extra lengths of fiber and extra thicknesses of resin that are subsequently machined off. For this purpose, in the portions of varying thickness in the fiber structure, as in the portion 204 of decreasing thickness, the reduction in the thickness of the preform is obtained by progressively removing weft layers during weaving.

Figure 2:
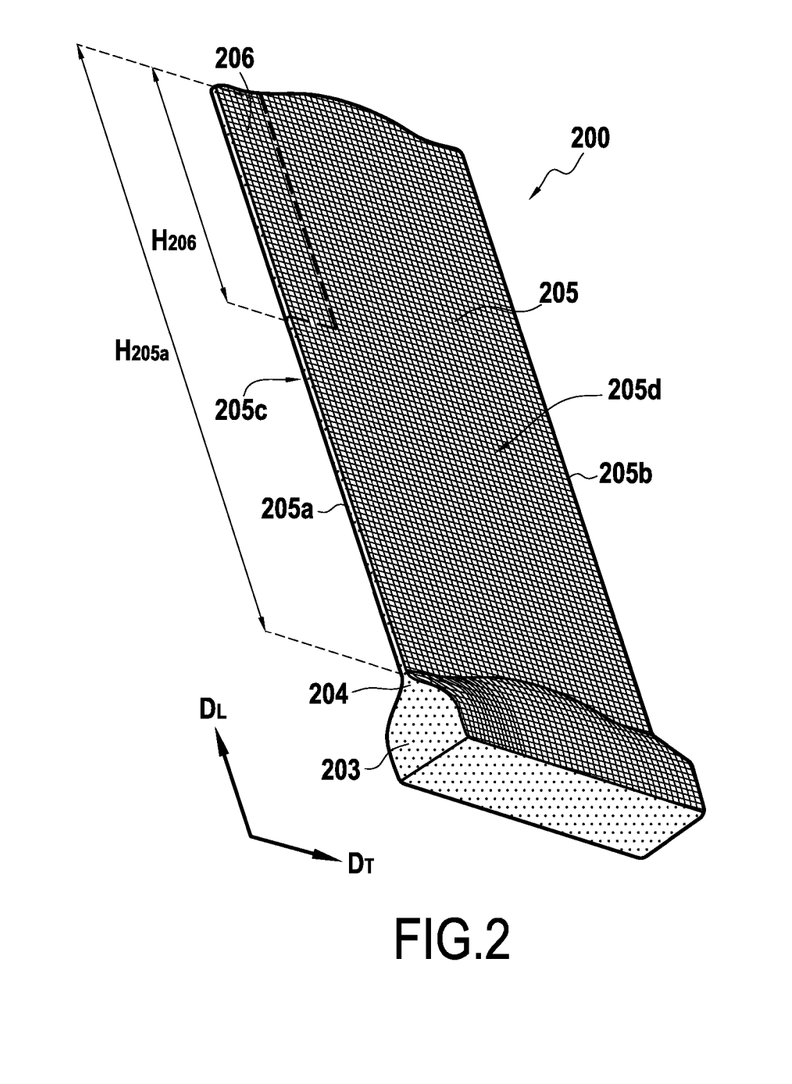
FIG. 2 is a diagrammatic view of a fiber structure obtained from the FIG. 1 fiber blank.

Once the fiber structure 200 in the blank 100 has been woven, non-woven yarns are cut away. This produces the fiber structure 200 as shown in FIG. 2, which structure is woven as a single piece. The edge 205a of the fiber structure 200 is to form a leading edge of the blade, this leading edge needing to present a thickness that is small, at least in its top portion, e.g. less than 3 mm. This small thickness is difficult to achieve with three-dimensional weaving because of the size or coarseness of the warp and weft yarns, which size is too great. In addition, if a small thickness can be obtained with three-dimensional weaving only by using a minimum number of layers of warp and weft yarns, i.e. two layers of warp yarns and one layer of weft yarns, or vice versa, then that number is insufficient to provide mechanical strength equivalent to the strength obtained in the remainder of the fiber structure that includes a larger number of layers of warp yarns and of layers of weft yarns.

In the presently-described example, the portion of the leading edge of the blade that is to present the small thickness that is incompatible with three-dimensional weaving is represented by the portion 206 of the fiber structure marked in FIG. 2. The portion 206 extends over a height $H_{206}$, which is less than the total height $H_{205a}$ of the edge 205a in the longitudinal direction $D_L$. The portion 206 corresponds to the portion of the leading edge of the final blade body that needs to satisfy aerodynamic requirements. The remainder of the edge 205a situated between the portion 204 of decreasing thickness and the portion 206 in the longitudinal direction $D_L$ can be conserved in the form of three-dimensional weaving since there is no need to reduce its thickness as much as in the portion 206. The height $H_{206}$ of the portion 206 generally corresponds to 40% or less of the total height $H_{205a}$ of the leading edge that is to be made.

Nevertheless, the portion 206 can extend over a greater height in the longitudinal direction, or indeed over the entire height $H_{205a}$ of the edge 205a.

Figure 3:
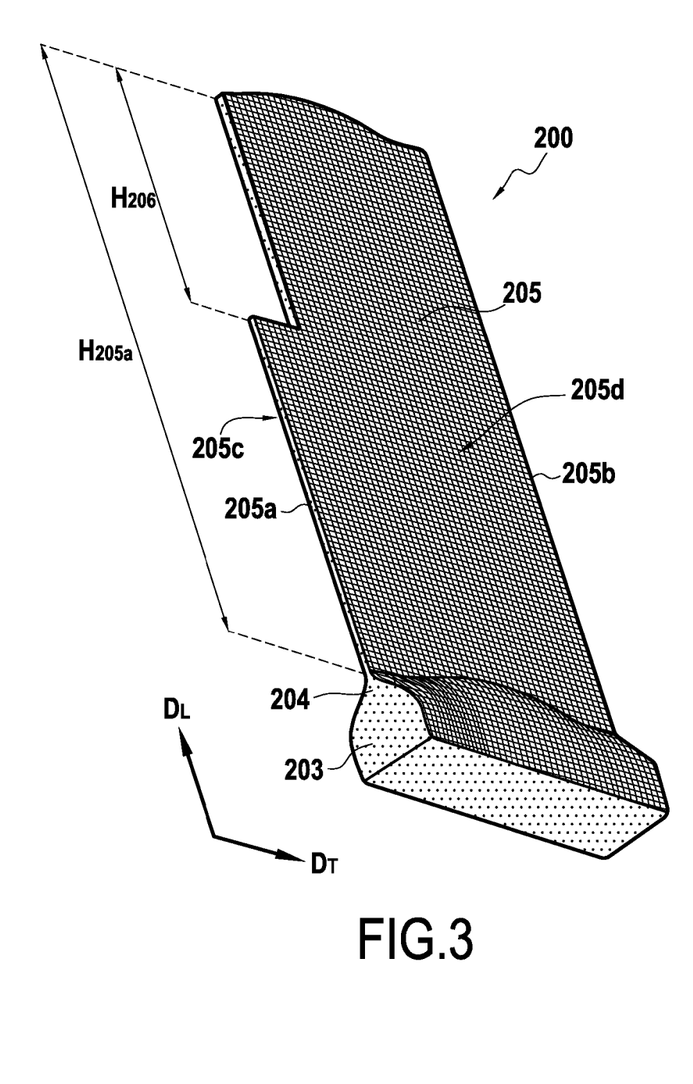
FIG. 3 is a diagrammatic view of a fiber structure after removing a portion of leading edge.

In accordance with an embodiment of the invention, and as shown in FIG. 3, the portion 206 is separated from the fiber structure 200, e.g. by being cut away, in order to be replaced by a portion that is obtained from short fibers as explained below in detail. In a variant embodiment, the portion 206 of the fiber structure 200 need not be woven, with the floated yarns present in this portion being cut away at the end of weaving.

Figure 4:
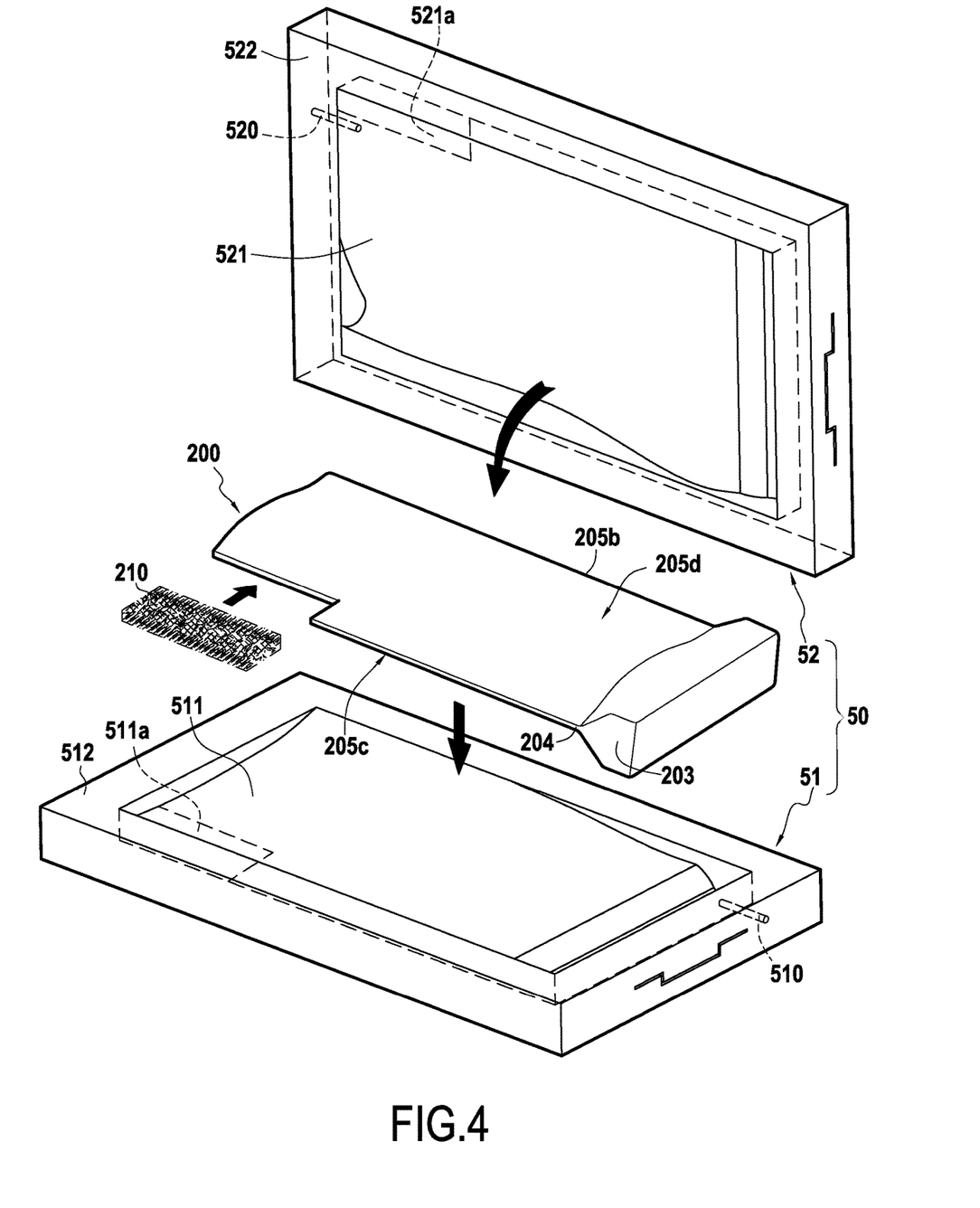
FIG. 4 is a diagrammatic perspective view showing the FIG. 4 fiber structure placed in an injection mold together with a portion made of short fibers.

The following step consists in placing the fiber structure 200 in an injection mold 50 (FIG. 4). The mold 50 comprises a first shell 51 having a first cavity 511 in its center corresponding in part to the shape and the dimensions of the blade that is to be made, the cavity 511 being surrounded by a first contact plane 512. The first shell 51 also includes an injection port 510 for enabling a liquid composition that is a matrix precursor to be injected into a fiber preform. The mold 50 also comprises a second shell 52 including in its center a second cavity 521 corresponding in part to the shape and the dimensions of the blade that is to be made, the second cavity 521 being surrounded by a second contact plane 522 that is to co-operate with the first contact plane 512 of the first shell 51. The second shell also has a discharge port 520 for co-operating with a pumping system.

The first and second shells may be made entirely out of a metal material, e.g. such as aluminum, or they may be made out of graphite.

The fiber structure 200 is initially positioned in the cavity 511 of the first shell 51, as shown in FIG. 4. The first shell has a portion 511a of the cavity 511 that corresponds to the portion 206 of the fiber structure that has been removed. Once the fiber structure 200 has been placed in the first shell 51, the portion 511 is filled with a plurality of short fibers 210, e.g. short carbon fibers, as shown in FIG. 4. The short fibers 210 are placed in random manner, i.e. without any determined orientation. The short fibers present a diameter that is much smaller than the diameter of the warp and weft yarns or strands used for weaving the fiber structure 200, the short fibers presenting a diameter that is less than or equal to 50 micrometers (μm), for example. Typically, the short fibers have a length lying in the range 0.1 mm to 1 mm. Nevertheless, so-called "intermediate" short fibers of length lying in the range 1 mm to 50 mm may also be used. Beneficially, the scrap yarn or strands resulting from fabricating the fiber structure can be used as a source for providing short fibers, e.g. after being chopped up multiple times so as to separate the fibers present in the yarns or strands and obtain short fibers of small diameter.

Thereafter, the second shell 52 is placed on the first shell 51 in order to close the shaping tooling 50, with the second shell 52 including a portion 521a of its cavity 512 that corresponds to the portion that has been filled with the short fibers 210.

Figure 5:
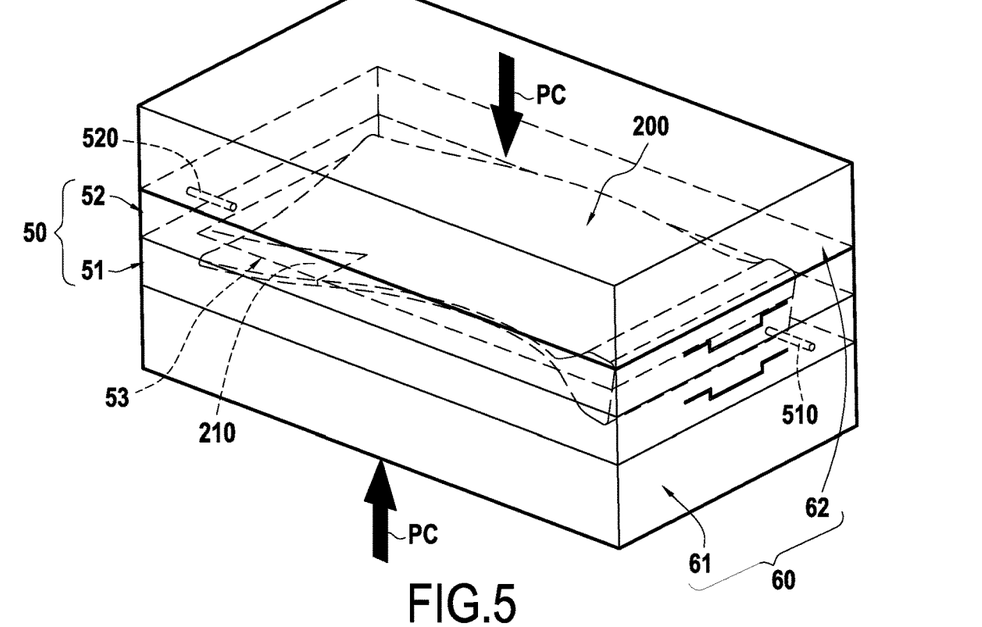
FIG. 5 is a diagrammatic perspective view showing the injection mold placed in injection tooling.

Once the tooling 50 has been closed, as shown in FIG. 5, the first and second shells are in an "assembled" position, i.e. a position in which their first and second cavities 511 and 521 are placed facing each other, while the first and second contact planes 512 and 522 are also facing each other. In this configuration, the first and second cavities 511 and 521 together define an inside volume 53 having the shape of the blade that is to be made and in which the fiber structure 200 and the short fibers 210 are placed. In the presently-described example, the cavity 511 is to form the pressure side of the blade fiber preform, while the cavity 521 is for forming the suction side of the blade preform.

Figure 6:
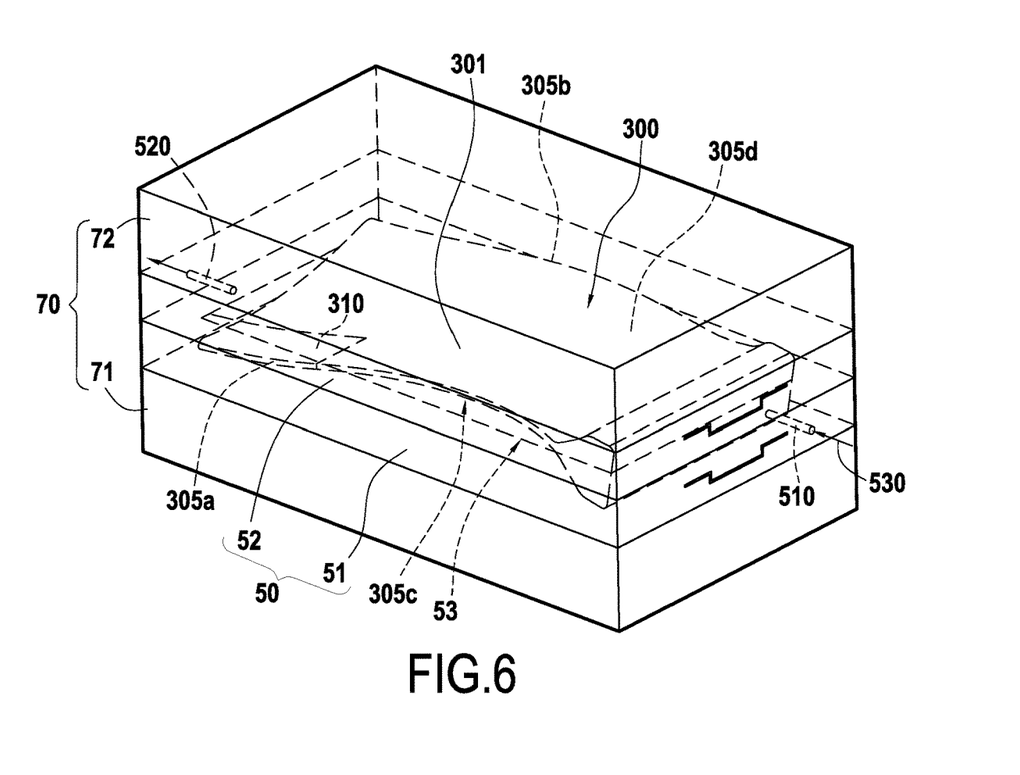
FIG. 6 is a diagrammatic perspective view showing the performance of an operation of injecting a matrix-precursor liquid composition into the fiber preform in order to obtain a blade body made of composite material.

The mold 50 containing the fiber structure 200 and the short fibers 210 may be placed in compacting and shaping tooling 60 (FIG. 5). The tooling 60 comprises a bottom portion 61 on which the first shell 51 of the tooling 50 rests, and a top portion 62 that is placed on the second shell 52 of the tooling 50. The compacting and shaping tooling 60 has compacting pressure PC applied thereto, e.g. by placing the tool 60 in a press (not shown in FIG. 5). Applying the pressure PC moves the first and second shells 51 and 52 towards each other until the first and second contact planes 512 and 522 meet, thereby both compacting the fiber structure 200 and the short fibers 210 with a determined compaction ratio in order to obtain a likewise determined fiber fraction, and also shaping the fiber structure so that it matches the profile of the blade that is to be fabricated. A preform 300 is thus obtained that is constituted by the fiber structure 200 and by the short fibers 210 and that presents the shape of the blade that is to be made (FIG. 6). The preform 300 presents a profile of thickness that varies between its edge 305*a* that is to form a leading edge of the blade and its edge 305*b* that is to form a trailing edge of the blade. The preform 300 has first and second faces 305*c* and 305*d* extending between the edges 305*a* and 305*b* in order to form the pressure side and suction side faces, or vice versa, of the blade airfoil. The preform 300 has a first portion 301 constituted by a plurality of yarn layers 101 and 102 (FIG. 1) interlinked by three-dimensional or multilayer weaving, and a second portion 310 constituted by short fibers 210 oriented in random manner.

In FIG. 6, the mold 50 is placed between a bottom portion 71 and a top portion 72 of injection tooling 70. The bottom portion 71 and the top portion 72 of the tooling 70 are fitted with heater means (not shown in FIG. 6). Once the tooling 70 has been closed, the mold is then molded by impregnating the preform 300 with a thermosetting resin that is polymerized by heat treatment. For this purpose, use is made of the injection molding technique known by the term "resin transfer molding" (RTM). In the RTM technique, a resin 530, e.g. a thermosetting resin, is injected via the injection port 510 of the first shell 51 into the inside space 53 defined between the two cavities 511 and 521 and occupied by the preform 300. The port 520 of the second shell 52 is connected to a discharge duct that is maintained under pressure (not shown in FIG. 6). This configuration serves to set up a pressure gradient between the bottom portion of the preform 300 into which the resin is injected, and the top portion of the preform, which is situated in the proximity of the port 520. In this way, the resin 530 that is injected substantially into the bottom portion of the preform impregnates the entire preform progressively by flowing therethrough until it reaches the discharge port 520, through which surplus resin is discharged. Naturally, the first and second shells 51 and 52 of the mold 50 may each have a respective plurality of ports for injection and discharge purposes.

By way of example, the resin used may be an epoxy resin of the 180° C. temperature class (i.e. 180° is the maximum temperature it can withstand without loss of characteristics). Resins suitable for RTM techniques are well known. In an embodiment, they present low viscosity in order to facilitate injection among the fibers. The temperature class and/or the chemical nature of the resin is/are selected as a function of the thermomechanical stresses to which the part is to be subjected. Once resin has been injected throughout the reinforcement, it is polymerized by heat treatment in accordance with the RTM technique.

After injection and polymerization, the blade body is unmolded. It may optionally be subjected to a post-curing cycle in order to improve its thermomechanical characteristics (increasing its glass transition temperature). In the end, the blade is trimmed in order to move excess resin, and chamfers are machined. No other machining is needed since, given that the part is molded to the "net shape" of the blade, it complies with the required dimensions after the machining for trimming.

Figure 7:
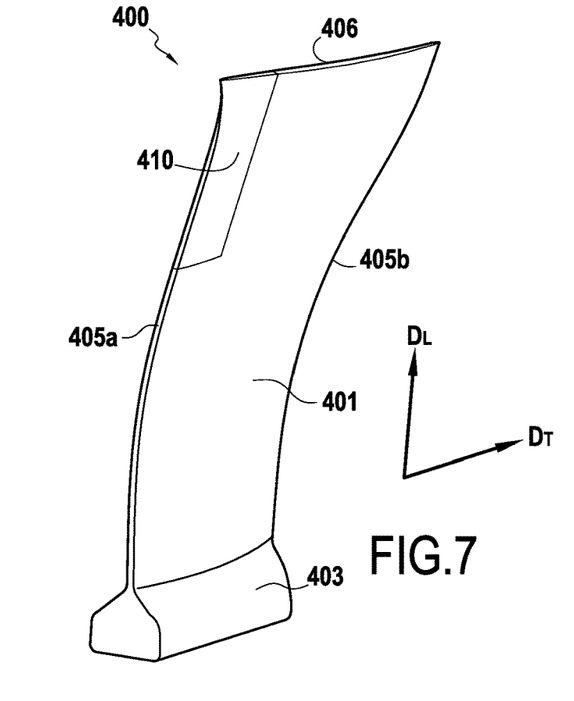
FIG. 7 is a diagrammatic perspective view of the composite material blade body obtained after performing the operation of FIG. 6.

As shown in FIG. 7, a blade body 400 is obtained that is constituted by fiber reinforcement densified by a matrix, the blade body comprising an airfoil 405 extending in a longitudinal direction $D_L$ between a root or bottom portion 403 and a tip or top portion 406, and it extends in a transverse direction $D_T$ between a leading edge 405*a* and a trailing edge 405*b*. In accordance with an embodiment of the invention, the fiber reinforcement of the blade body 400 has a first portion 401 constituted by a plurality of layers of yarns (yarns 101 and 102 in FIG. 1) that are interlinked by three-dimensional or multilayer weaving, and a second portion 410 adjacent to the first portion and forming a portion of the leading edge of the blade body, the second portion 410 comprising the plurality of short fibers that are oriented in random manner (short fibers 210 of FIG. 4). The yarns of the plurality of yarns of the first portion 401 and the short fibers of the second portion 410 are embedded in the matrix, the matrix thus providing cohesion between the portion of the reinforcement constituted by the woven yarns and the portion of the reinforcement constituted by the short fibers.

In applications where there are no risks of impacts against foreign bodies, e.g. birds, the resulting blade body may be used as such, i.e. it already constitutes a blade.

Figure 8:
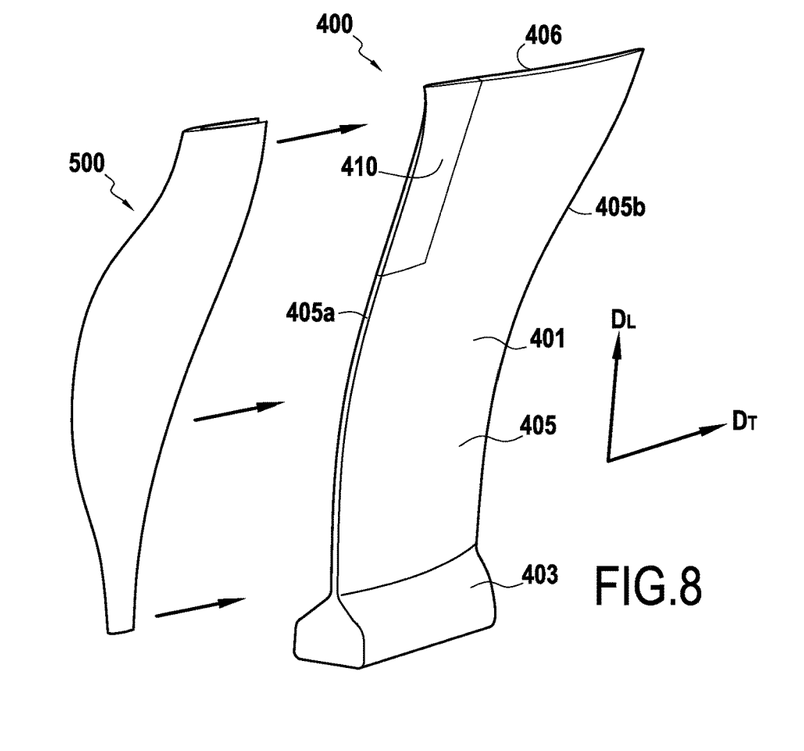
FIG. 8 is a diagrammatic perspective view showing a piece of metal foil being assembled on the leading edge of the FIG. 7 blade body.

Otherwise, e.g. for an aeroengine fan blade, it is necessary to protect the leading edge of the blade body, since the transition between the first portion 401 comprising the woven yarns and the second portion 410 comprising the short fibers may present insufficient mechanical strength against impacts with foreign bodies. For this purpose, and as shown in FIG. 8, metal foil 500 is assembled, e.g. by means of adhesive bonding, on the leading edge 405*a* of the blade body. The foil may also be assembled to the blade body at the same time as injecting and polymerizing the resin. Under such circumstances, the foil is placed in the injection mold together with the fiber structure, and the foil is fastened to the blade body by co-curing.

Figure 9:
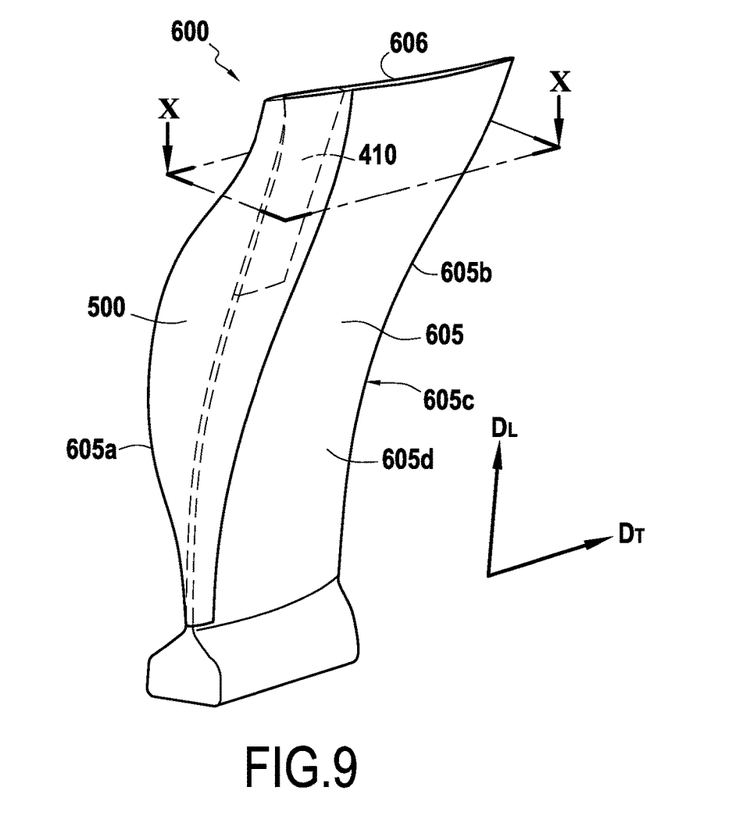
FIG. 9 is a diagrammatic perspective view showing a composite material blade obtained after assembling the piece of metal foil on the leading edge of the blade body.
Figure 10:
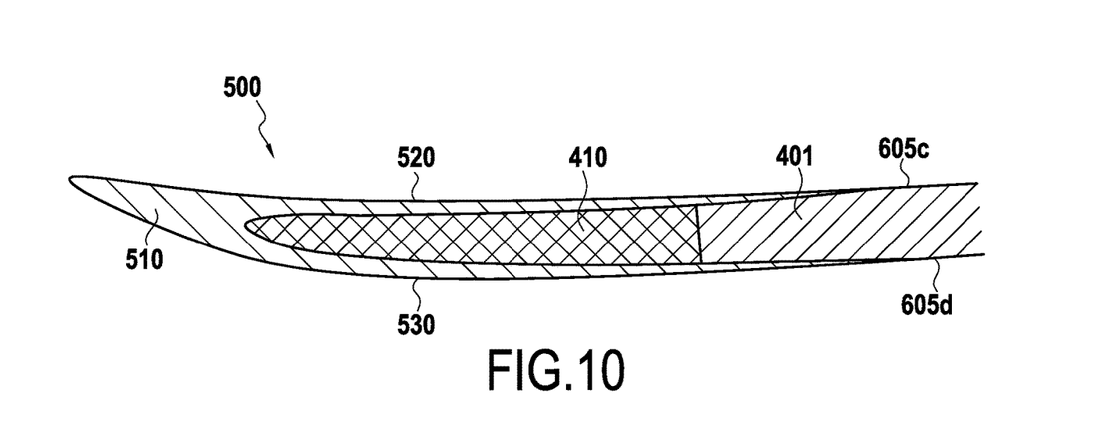
FIG. 10 is a cross-section view of the FIG. 9 blade.

After assembly, a composite material blade 600 is obtained having an airfoil 605 that extends in a longitudinal direction $D_L$ between a root or bottom portion 603 and a tip or top portion 606, and it extends in a transverse direction $D_T$ between a leading edge 605*a* and a trailing edge 605*b*. In this example, the leading edge is constituted at least in part by the metal foil 500 covering the second portion 410 (FIG. 9). More precisely, and as shown in FIG. 10, the metal foil 500 comprises a solid nose 510 forming the leading edge proper and two fins 520 and 530 extending from the nose 510 respectively over the pressure side face 605*c* and over the suction side face 605*d* of the blade. The fins serve to compensate for the difference in stiffness between the first portion 401 and the second portion 410 and to transfer forces, thereby imparting sufficient mechanical strength to the blade.

Depending on requirements in terms of the mechanical strength of the blade, the shape of the transition between the first portion 401 and the second portion 410 may be other than a rectilinear shape as shown herein. The transition between these two portions may for example present a shape that is oblique or that is circularly arcuate.

The invention claimed is:

1. A blade body made of composite material comprising fiber reinforcement densified by a matrix, the blade body comprising an airfoil and a root or bottom portion, the airfoil extending in a longitudinal direction between the root or bottom portion and a tip or top portion thereof and in a transverse direction between a leading edge and a trailing edge, wherein the fiber reinforcement is provided as part of the airfoil and comprises a first portion constituted by a plurality of yarn layers interlinked by three-dimensional or multilayer weaving, and a second portion forming all or part of at least one leading edge of the airfoil, the second portion comprising a plurality of short fibers oriented in random manner, yarns of the plurality of yarn layers of the first portion and the short fibers of the second portion being embedded in the matrix.

2. The blade body according to claim 1, wherein the second portion extends in the longitudinal direction over a height that is less than the total height of the leading edge of the blade.

3. The blade body according to claim 1, wherein the short fibers are carbon fibers presenting length lying in the range 1 mm to 50 mm.

4. The blade body according to claim 1, wherein the short fibers are carbon fibers presenting length lying in the range 0.1 mm to 1 mm.

5. A composite material blade comprising a blade body according to claim 1, wherein the leading edge of the airfoil further comprises metal foil covering the second portion.

6. The blade according to claim 5, wherein the blade is a blade selected from at least: a fan blade, an outlet guide vane, an inlet guide vane, and a variable stator vane.

7. A method of fabricating a blade body made of composite material, the method comprising:

making a fiber texture;
placing the fiber texture in an injection mold;
injecting a resin into the fiber preform; and
transforming the resin into a matrix so as to obtain a blade body made of composite material comprising fiber reinforcement densified by a matrix, the blade body comprising an airfoil and a root or bottom portion, the airfoil extending in a longitudinal direction between the root or bottom portion and a tip or top portion thereof and extending in a transverse direction between a leading edge and a trailing edge of the blade;
wherein the fiber preform provided as part of the airfoil of the blade body comprises a first portion constituted by a plurality of yarn layers interlinked by three-dimensional or multilayer weaving and a second portion constituted by short fibers oriented in random manner, the short fibers of the second portion being placed adjacent to the first portion in a portion of the injection mold corresponding to all or part of at least the leading edge or at least the trailing edge of the blade.

8. The method according to claim 7, wherein the short fibers of the second portion are placed adjacent to the first portion in a portion of the injection mold corresponding to a portion of the leading edge of the blade in the longitudinal direction.

9. The method according to claim 7, wherein the short fibers are carbon fibers presenting length lying in the range 1 mm to 50 mm.

10. The method according to claim 7, wherein the short fibers are carbon fibers presenting length lying in the range 0.1 mm to 1 mm.

11. A method of fabricating a blade made of composite material, the method comprising making a blade body using the method according to claim 7, the method further comprising fastening metal foil on the second portion.

* * * * *